United States Patent Office 3,497,264
Patented Feb. 24, 1970

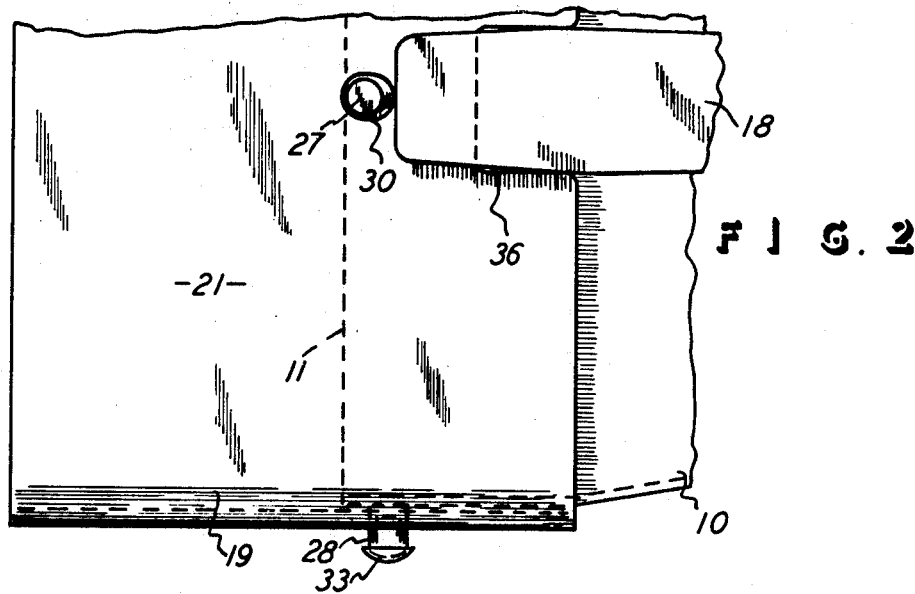
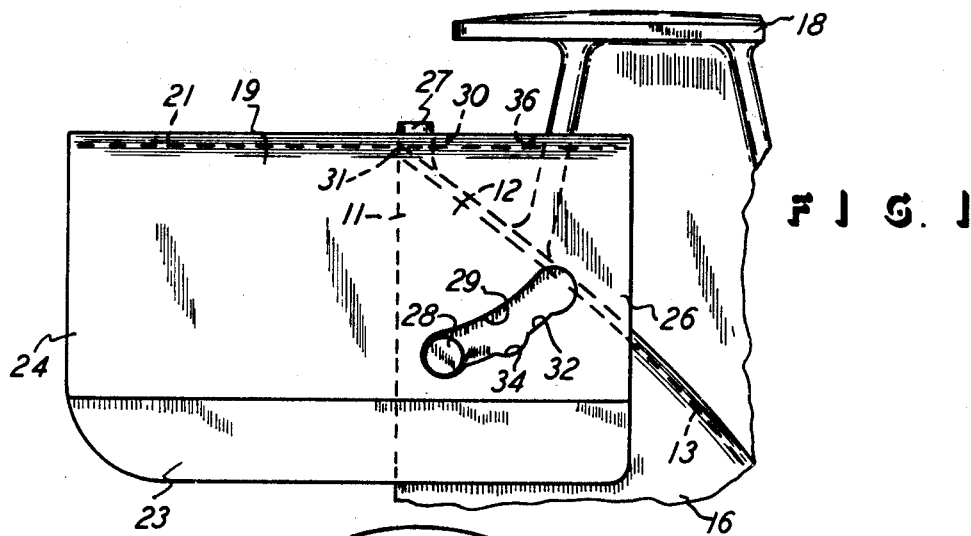
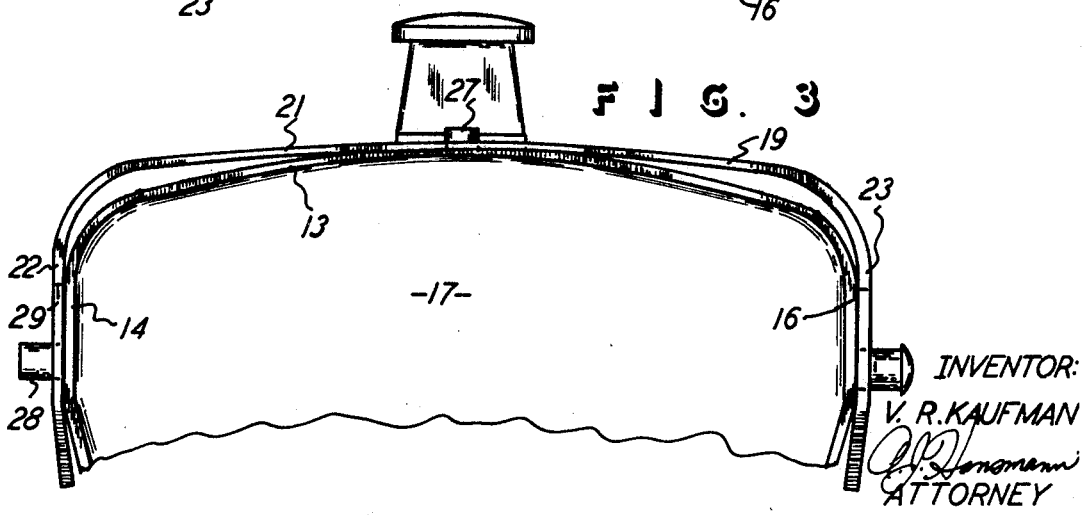

3,497,264
COMBINED DEFLECTOR AND SNOW CHUTE
Vernon R. Kaufman, Racine, Wis., assignor to Jacobsen Manufacturing Company, Racine, Wis., a corporation of Wisconsin
Filed Apr. 17, 1968, Ser. No. 721,983
Int. Cl. B65g 53/04
U.S. Cl. 302—61       6 Claims

ABSTRACT OF THE DISCLOSURE

A snow chute having a passageway for the flow of snow therethrough, and a deflector movably mounted on the outlet end of the chute. Connecting means extend between the chute and deflector for adjusting the position of the deflector, and these connecting means include index means which permit the deflector to be set in a selected one of several possible positions, for controlling the path of the flow of snow.

Background of the invention

This invention relates to a combined deflector and snow chute.

Chutes for the delivery of material flowing or being blown through the chute are employed in many different arts, including the snow throwing art, lawn mowing art, agricultural implement art, and many other arts where material is blown, flowing, and generally conducted in the nature of conducting and controlling the flow of materials. Further, it is common practice to provide a deflector at the outlet end of the chute, so that the path of the blowing material can be controlled. Such deflectors are commonly adjustable so that the flowing material can be directed in a particular direction or at a specific angle.

However, the combined deflector and chute of the prior art commonly require complicated connecting and adjusting means for positioning the deflector in the desired manner. Usually a bolt and nut connection extends between the chute and the deflector for the connecting and adjusting means, and this type of fastener requires tools and manipulation in order to achieve the desired adjusted positions and then secure the deflector in that selected position.

Still further, in considering the prior art, when the deflector is set in its adjusted position, the connecting means must be so arranged that it will hold the deflector against the force caused by the flowing material being impinged upon the deflector. This therefore also requires special considerations and complicated constructions, in order that the deflector can be secured in the desired position.

Accordingly, it is a general object of this invention to provide an improved combined deflector and snow chute, and to do so with a simplified, inexpensive, and easily adjustable deflector. In achieving these several features, the structure embodying this invention does not require that any wrenches or other tools be utilized for setting and securing the deflector in adjusted positions.

Another object of this invention is to provide a combined deflector and snow chute wherein the deflector is readily and easily positioned in a selected one of several adjusted positions. Still further, the securing of the deflector in a selected position is actually enhanced by the force of the material flowing through the chute and being impinged upon the deflector.

In accomplishing the aforesaid objects, and in overcoming the aforesaid problems attending the prior art, the structure embodying this invention can be made of a resilient material, such as a sheet metal or plastic, and the resiliency in the deflector can therefore be utilized by having the deflector in a shape which will cause the deflector to secure itself in the selected adjusted position. Therefore, no expensive and involved connecting means are required for securing the deflector to the chute, and, consequently, no special tools are necessary for releasing the deflector from the chute and for setting the deflector in a desired position.

Brief description of the drawing

FIG. 1 is a side elevational view of a combined deflector and snow chute incorporating this invention, and with the chute fragmentarily shown.

FIG. 2 is a top plan view of FIG. 1, with only a fragment thereof being shown.

FIG. 3 is a front elevational view of FIG. 1.

Detailed description of the preferred embodiment

A snow chute 10 is fragmentarily shown, and it will be understood that it is generally U-shaped and is made of a sheet material, such as sheet metal or plastic. An outlet 11 exists on the outlet or upper end 12 of the chute 10, and it will be understood that snow will be conveyed generally along the curved upper wall 13 of the chute 10, so that the snow will flow upwardly and to the left as viewed in FIG. 1. FIG. 3 therefore also shows the intermediate or upper wall 13 of the U-shape in the chute 10, and it shows the side walls or legs 14 and 16 of the chute 10. A chute 10 would therefore be mounted on a snow thrower, in any conventional manner, such as shown in U.S. Patent 3,214,223, for instance. The chute 10 therefore provides a snow-flow pasageway 17.

The chute is commonly rotatable on its mounting (not shown) on the unshown snow thrower. Therefore, a handle 18 extends above the chute wall 13 for facilitating rotation of the chute 10 about an upright or vertical axis.

A U-shaped deflector 19 is mounted on the chute 10 to provide an extension to the top chute wall 13 and to the side walls 14 and 16 of the chute 10. Thus the deflector 19 has an intermediate or top wall 21, and it has side walls or legs 22 and 23. The deflector 19 may also be made of a sheet metal or plastic material, and this material is resilient in that it can be distorted or flexed, and it will return to its original position within reasonable limits of the flexing. The chute 19 therefore has a snow flow outlet end 24, and it has an inlet end 26 which is snug with and nested over the outlet end 12 of the chute 10.

The connecting means for adjustably mounting the deflector 19 on the chute 10 includes a pivot post 27 extending from the chute 10 and thereabove, and it includes a projection 28 extending laterally on each of the chute side walls 22 and 23. The deflector 19 has an arcuate slot 29 extending in each of its legs or side walls 22 and 23, and the chute projections 28 are received in the slots 29. Likewise, the deflector 19 has an opening 30 which receives the pivot post 27, and the deflector top wall 21 therefore rests downwardly on the chute along the pivot line 31 on the front surface of the post 27. Also, the chute 10, being the support of the deflector 19, is U-shaped and resilient, causing the lower edge 32 defining the slot 29 to be in snug contact with the lower portion of the chute projection 28. That is, the deflector is secured to the chute 10 in the nature of being snapped thereon or spring loaded thereon. Also, the projections 28 may have restraining means such as screw heads 33 thereon to prevent the legs 22 and 23 of the deflector 19 from inadvertently sliding off the projections 28.

FIG. 1 further shows that the lower edge 32 defining the arcuate slot 29 has notches 34, and three such notches are shown. Thus the projection 28 nests within the notches 34, and the deflector can therefore be set in one of three adjusted and secured positions. The arrangement may be the same on both sides of the combined chute and deflector being described.

FIGS. 1 and 2 show that the top wall 21 of the deflector 19 has an opening 36 for receiving the portion of the handle 18 so that the deflector can be pivoted about the pivot line 31.

The projections 28 and slots 29 are index means with the adjustment notches 34. The radius of curvature of the slot 29 is centered on the line 31, which is along the front surface of the post 27. Movement of the deflector about the line 31 permits latching the deflector in adjusted angled positions on the chute 10.

FIG. 3 shows that the deflector 19 is spaced above the chute 10 at the sides of the deflector 19. This permits the deflector 19 to be sprung onto the chute 10, as mentioned, so the deflector top 21 is being bent downwardly and it tends to return to a flat condition. This creates the resilient or spring force holding the deflector snugly on the projections 28 and the post 27. Further, under the force of flowing snow impinged against the underside of the deflector top 21, the deflector is additionally forced into latching on the projections 28.

What is claimed is:

1. In a combined deflector and snow chute having a passageway for the flow of snow along a path through said chute which also has an outlet end, a deflector movably mounted on said chute outlet end and being adjustable relative to said path of the snow flowing through said passageway for deflecting the flow of snow, connecting means operative between said chute and said deflector for securing the latter in adjusted positions on said chute, the improvement comprising said connecting means including index means arranged to latch said deflector in adjusted positions on said chute, said index means having notches on said deflector, said chute having a projection received in said notches for mating said notches with said projection in adjustably positioning said deflector on said chute, said deflector being resilient to be yieldingly urged in a direction to have said notches releasably lock with said projection in response to the resilience of said deflector.

2. The subject matter of claim 1, wherein said connecting means further includes a pivot post extending between said chute and said deflector, and said index means is piloted on said pivot post for pivotal movement of said deflector on said chute in adjustably positioning said deflector.

3. The subject matter of claim 2, wherein said index means is centered on said pivot post and is movable arcuately thereto and latches said deflector in its adjusted positions.

4. The subject matter of claim 1, wherein said connecting means further includes a pivot post extending between said chute and said deflector, and said index means includes an arcuate slot in said deflector and centered about said pivot post and having notches in said deflector along the edge of said arcuate slot, and said index means includes a projection on said chute extending into said arcuate slot and mated with a selected one of said notches in the adjustment of said deflector.

5. The subject matter of claim 4, wherein said deflector is U-shaped and extends with the intermediate portion of its U-shape in the path of snow flow to be urged upwardly by the snow flow, and said index means is on the leg portions of the U-shaped and said notches are upwardly open notches movable upwardly under the influence of the snow flow for latching said deflector through the use of said notches.

6. The subject matter of claim 1, wherein said deflector is movable on said chute in a direction oblique to the path of snow flow, in addition to the adjustment movement of said deflector, and said index means is also arranged for the movement of said deflector in said oblique direction and thereby effect the latching of said deflector.

References Cited
UNITED STATES PATENTS

| | | | |
|---|---|---|---|
| 1,588,745 | 6/1926 | Kear et al. | 302—37 |
| 2,741,512 | 4/1956 | Stott et al. | 302—61 |
| 2,833,410 | 5/1958 | Sisulak et al. | 302—61 |
| 2,981,485 | 4/1961 | Mainone | 302—37 |

ANDRES H. NIELSEN, Primary Examiner

U.S. Cl. X.R.

37—43